US011875095B2

(12) United States Patent
Schumann et al.

(10) Patent No.: US 11,875,095 B2
(45) Date of Patent: Jan. 16, 2024

(54) METHOD FOR LATENCY DETECTION ON A HARDWARE SIMULATION ACCELERATOR

(71) Applicant: International Business Machines Corporation, Armonk, NY (US)

(72) Inventors: John A. Schumann, Austin, TX (US); Tharunachalam Pindicura, Austin, TX (US); Shricharan Srivatsan, Austin, TX (US); Vivek Britto, Austin, TX (US); Madhumitha Venkataraman, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 630 days.

(21) Appl. No.: 16/918,675

(22) Filed: Jul. 1, 2020

(65) Prior Publication Data

US 2022/0004680 A1    Jan. 6, 2022

(51) Int. Cl.
*G06F 30/20*  (2020.01)
*G06F 9/455*  (2018.01)
(Continued)

(52) U.S. Cl.
CPC ............ *G06F 30/20* (2020.01); *G06F 9/445* (2013.01); *G06F 9/455* (2013.01); *G06F 2115/10* (2020.01)

(58) Field of Classification Search
CPC .......... G06F 30/20; G06F 9/445; G06F 9/455; G06F 2115/10; G06F 2119/12;
(Continued)

(56) References Cited

U.S. PATENT DOCUMENTS 5,809,450 A     9/1998  Chrysos et al.
6,092,180 A *   7/2000  Anderson ............. G06F 9/3836
                                            712/216
(Continued)

FOREIGN PATENT DOCUMENTS

WO    WO2014004222    *  1/2014  ............. G06F 11/22
WO    2019012333 A1      1/2019

OTHER PUBLICATIONS

Yourst, M. "PTLsim: A Cycle Accurate Full System x86-64 Microarchitectural Simulator" 2007 IEEE International Symposium on Performance Analysis of Systems & Software; DOI: 10.1109/ISPASS.2007.363733 [retrieved on Nov. 13, 2022] (Year: 2007).*
(Continued)

*Primary Examiner* — Rehana Perveen
*Assistant Examiner* — Alfred H B Wechselberger
(74) *Attorney, Agent, or Firm* — Garg Law Firm, PLLC; Rakesh Garg; Nicholas Welling

(57) ABSTRACT

A method for performing automated detection of transaction latency for a processor design model running an application in a hardware simulation accelerator. The method includes loading the processor design model into the hardware simulation accelerator, loading the application into the processor design model running within the hardware simulation accelerator, simulating the processor design model running the application within the hardware simulation accelerator, and for each individual transaction of the application: establishing a first checkpoint at a start of an execution of the individual transaction by creating a breakpoint and resetting a counter, establishing a second checkpoint at a completion of the transaction by creating another breakpoint and obtaining latency information for the second checkpoint. The latencies of the individual transaction from the start to the completion are measured based on the latency information.

14 Claims, 6 Drawing Sheets

(51) Int. Cl.
  *G06F 9/445* (2018.01)
  *G06F 115/10* (2020.01)
(58) Field of Classification Search
  CPC .... G06F 30/3312; G06F 30/331; G06F 30/25;
      G06F 30/27; G06F 30/28; G06F
      2111/00–2119/22; G06F 30/3315
  See application file for complete search history.

(56) References Cited

U.S. PATENT DOCUMENTS

| | | | | |
|---|---|---|---|---|
| 7,827,510 | B1* | 11/2010 | Schubert | G06F 30/331 |
| | | | | 716/111 |
| 9,465,903 | B1* | 10/2016 | Timmireddy | G06F 30/34 |
| 10,289,539 | B1* | 5/2019 | Arguelles | G06F 11/3664 |
| 11,113,441 | B1* | 9/2021 | Selvidge | H04B 1/40 |
| 2009/0193296 | A1* | 7/2009 | Kellington | G06F 11/261 |
| | | | | 714/33 |
| 2014/0019929 | A1* | 1/2014 | Raviv | G06F 30/331 |
| | | | | 716/112 |
| 2014/0244978 | A1* | 8/2014 | King | G06F 9/30098 |
| | | | | 712/217 |
| 2017/0154136 | A1* | 6/2017 | Eckmann | G06F 30/20 |
| 2018/0059182 | A1 | 3/2018 | Batra et al. | |
| 2019/0108004 | A1 | 4/2019 | Kavanagh et al. | |

OTHER PUBLICATIONS

Pinto, M. "Defining and using virtual platforms traces captured for debugging MPSoCs" [thesis] Distributed, Parallel, and Cluster Computing [cs.DC]. Université Grenoble Alpes; NNT : 2016GREAM003 [retrieved on Nov. 15, 2022] (Year: 2016).*

Rosa, F. "Fast and Accurate Evaluation of Embedded Applications for Many-core Systems" [thesis] Universidade Federal Do Rio Grande Do Sul (Year: 2014).*

Aarno et al. "Software and System Development using Virtual Platforms: Full-System Simulation with Wind River SIMICS" Chapter 3; DOI: http://dx.doi.org/10.1016/B978-0-12-800725-9.00003-2 [retrieved on Nov. 15, 2022] (Year: 2015).*

Simevski, A "Architectural framework for dynamically adaptable multiprocessors regarding aging, fault tolerance, performance and power consumption" [thesis] Brandenburgischen Technischen Universitat Cottbus-Senftenberg [retrieved on Nov. 12, 2022] (Year: 2014).*

Gligor et al. "Using Binary Translation in Event Driven Simulation for Fast and Flexible MPSoC Simulation" Codes+ISSS'09, Oct. 11-16, 2009, Grenoble, France; ACM 978-1-60558-628-Jan. 9, 2010 [retrieved on Nov. 12, 2022] (Year: 2009).*

Chung et al. "PROToFLEX: FPGA-accelerated Hybrid Functional Simulator" 2007 IEEE International Parallel and Distributed Processing Symposium; DOI: 10.1109/IPDPS.2007.370516 [retrieved on May 29, 2023] (Year: 2007).*

Hsu et al. "ArChiVED: Architectural Checking via Event Digests for High Performance Validation" 2014 Design, Automation & Test in Europe Conference & Exhibition (DATE); DOI: 10.7873/DATE.2014.330 [retrieved on Jun. 2, 2023] (Year: 2014).*

Ludden et al. "Functional Verification of the POWER4 Microprocessor and POWER4 Multiprocessor Systems," IBM Journal of Research & Development, vol. 46, No. 1, pp. 53-76, Jan. 2002.

* cited by examiner

METHOD FOR LATENCY DETECTION ON A HARDWARE SIMULATION ACCELERATOR

The present invention relates generally to a method, system, and computer program product for latency detection. More particularly, the present invention relates to a method, computer system, and computer program product for using a hardware simulation accelerator to perform automated detection of transaction latency for a processor design model.

BACKGROUND

Performance is an important factor to consider in circuit design, especially for processors. Performance has a correlation with the latency of transactions. In order to increase performance, one has to conduct performance debugging usually in a simulator environment.

In running a real model of a processor, traditional software simulation has performance in the order of merely hundreds of cycles per second. Traditional software simulation is a low-cost solution, since the only cost is the software and commodity hardware to execute this software. Nevertheless, the speed of traditional software-based simulation is not adequate for the growing verification needs of modern designs. A typical software-based simulator achieves 1-10 simulation cycles per second when applied to a full-chip design. Such simulation performance renders any regression test longer than a few hundreds of thousands of cycles practically infeasible. The industry has already reached design sizes that are too large to be simulated in full detail at tolerable simulation performance with software-based simulation.

BRIEF SUMMARY

The illustrative embodiments provide a method, computer system, and non-transitory computer-readable storage medium. An embodiment includes a method that performs automated detection of transaction latency for a processor design model running an application in a hardware simulation accelerator. The method includes loading the processor design model into the hardware simulation accelerator, loading the application into the processor design model running within the hardware simulation accelerator; and then simulating the processor design model running the application within the hardware simulation accelerator. For all transactions of the application a first checkpoint is established at a start of an execution of the individual transaction by creating a breakpoint and resetting a counter. The first checkpoint provides a snapshot of a meta state of the processor design model at said start. A second checkpoint is also established at a completion of the transaction by creating another breakpoint and obtaining a latency information for the second checkpoint. The second checkpoint provides another snapshot of the meta state of the processor design model at said completion. For each transaction, a measure of a latency of said the transaction from the start to the completion of the transaction is obtained based on the latency information.

An embodiment includes a non-transitory computer-readable storage medium. The non-transitory computer-readable storage medium includes instructions that are executed by a computer and cause the computer to load the processor design model into the hardware simulation accelerator, load the application into the processor design model running within the hardware simulation accelerator; simulate the processor design model running the application within the hardware simulation accelerator; and for all individual transaction of the application, establish a first checkpoint at a start of an execution of the individual transaction by creating a breakpoint and resetting a counter, wherein the first checkpoint provides a snapshot of a meta state of the processor design model at said start, establish a second checkpoint at a completion of the transaction by creating another breakpoint and obtaining a latency information for said second checkpoint, wherein the second checkpoint provides another snapshot of the meta state of the processor design model at said completion and measure a latency of said individual transaction from said start to said completion based on the obtained latency information.

Another embodiment includes a computer system The computer system includes a processor; and a memory. The memory stores instructions that, when executed by the processor, configure the apparatus to load the processor design model into the hardware simulation accelerator, load the application into the processor design model running within the hardware simulation accelerator, simulate the processor design model running the application within the hardware simulation accelerator; and for each individual transaction of the application: establish a first checkpoint at a start of an execution of the individual transaction by creating a breakpoint and resetting a counter, wherein the first checkpoint provides a snapshot of a meta state of the processor design model at said start, establish a second checkpoint at a completion of the transaction by creating another breakpoint and obtaining a latency information for said second checkpoint, wherein the second checkpoint provides another snapshot of the meta state of the processor design model at said completion, and measure a latency of said individual transaction from said start to said completion based on the obtained latency information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
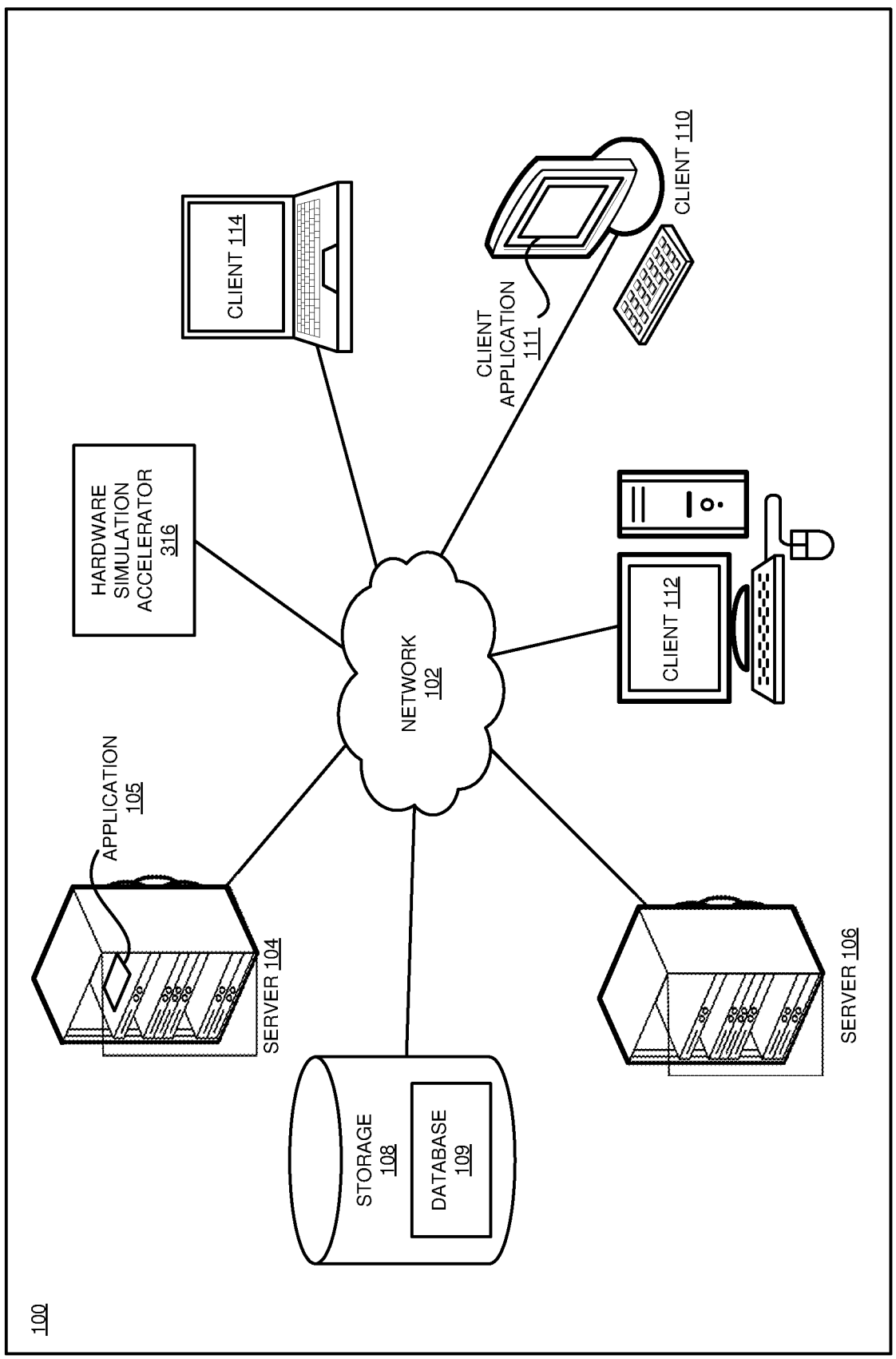
FIG. 1 illustrates a block diagram of a network of data processing systems in which illustrative embodiments may be implemented.

The illustrative embodiments recognize that processor chips have become fast and small, causing traditional simulator environments to be inadequate in processor performance debugging. Thus, latency in complex processor designs cannot be quickly simulated. Running real applications that require several billion cycles to execute on a software-based simulator in order to find the few cycles that expose design flaws is prohibitive and does not allow adequate and timely testing of performance benchmarks. A processor, or "microprocessor," is a small chip that resides in computers and other electronic devices. Its job is to receive input and provide the appropriate output. Software-based simulation can be regarded as a process that allows the user to observe an operation through simulation without actually performing that operation. Simulation software is used widely to design equipment so that the final product will be as close to design specs as possible without expensive in process modification. Performance of a processor is generally estimated in terms of accuracy, efficiency and speed of executing computer program instructions and latency can be regarded as is a time delay between the start and the completion of some instruction in a system being observed. Latency is a result of the limited velocity with which any interaction can take place.

Currently the speed of software-based simulation is not adequate for the growing verification needs of modern designs. A software-based simulator typically only achieves 1-10 simulation cycles per second when applied to a full-chip design. Such simulation performance renders regression tests longer than a few hundreds of thousands of cycles impossible to achieve. The industry has already reached design sizes that are too large to be simulated in full detail at tolerable simulation performance with software-based simulation.

The illustrative embodiments recognize that the presently available tools or solutions do not address these needs or provide adequate solutions for these needs. The illustrative embodiments used to describe the invention generally address and solve the above-described problems and other problems related to detecting latencies of individual transactions in a hardware simulation accelerator environment.

An embodiment compares a measured latency value of a transaction to a target or maximum latency value and establishes an updated target or maximum value based on the results of the comparison. Another embodiment establishes an initial target or maximum value based on an existing idle latency test. Particularly, some illustrative embodiments define the initial target or maximum value to be a percentage below performance latency result per transaction of the existing idle latency test. In an embodiment an initial target or maximum value is the first measured latency value.

Another embodiment compares the measured latency to a defined threshold and establishes a transaction failure when the defined threshold is exceeded and otherwise a transaction pass when said defined threshold is not exceeded. A further embodiment defines the threshold to be a percentage above a performance latency result per transaction of an existing latency test. The embodiments measure latency in a number of processor clock cycles taken to complete an individual transaction. Moreover, in another embodiment, the application that is tested is a workload software application or an exerciser.

Figure 2:
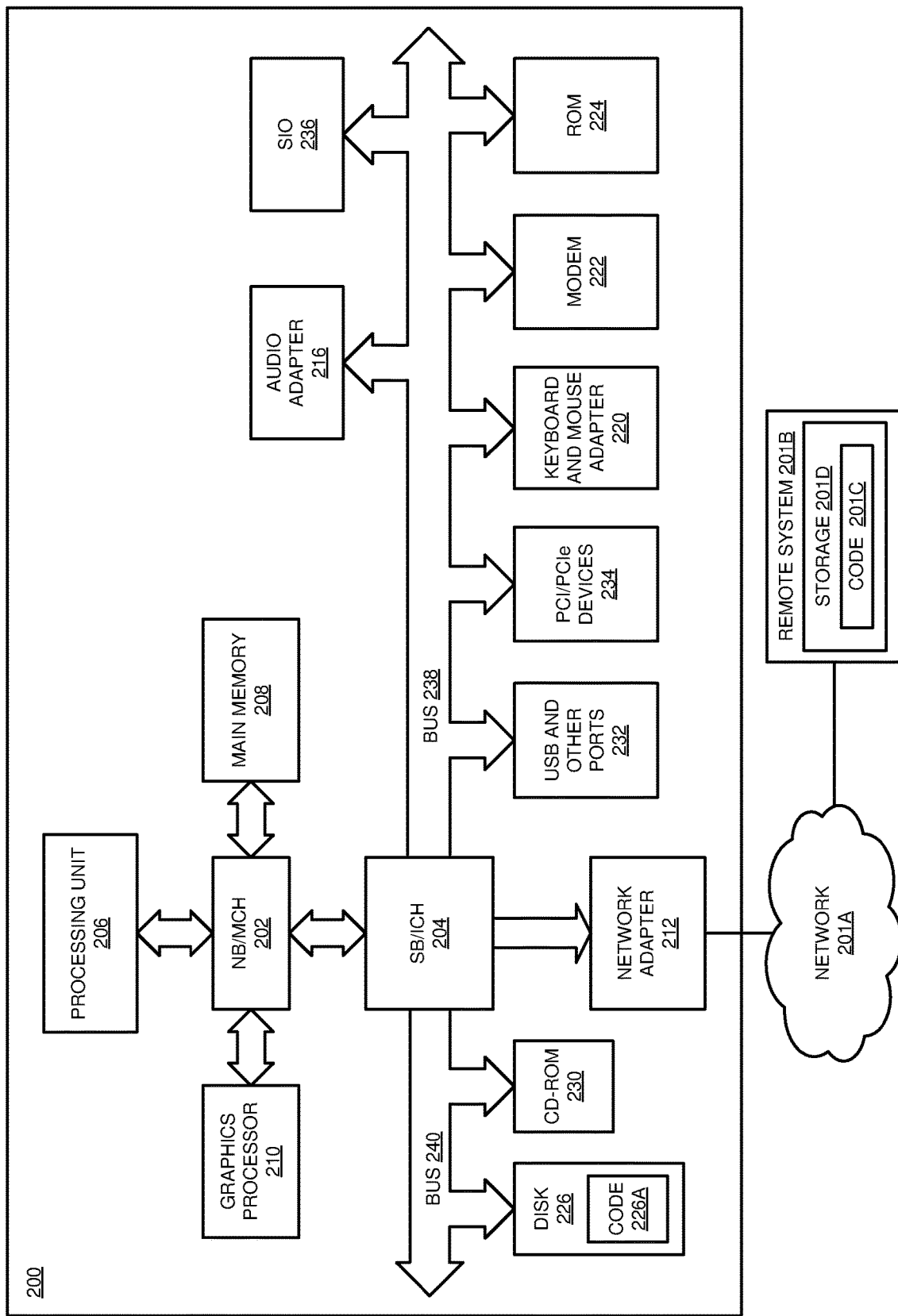
FIG. 2 illustrates block diagram of a data processing system in which illustrative embodiments may be implemented.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Application 105 implements an embodiment described herein. Application 105 can a be uploaded to a hardware simulation accelerator 316 to test a processor's execution of said application 105 in order to obtain latency values of individual instructions in the application 105.

Servers 104 and 106, storage unit 108, and clients 110, 112, and 114, and hardware simulation accelerator 316 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
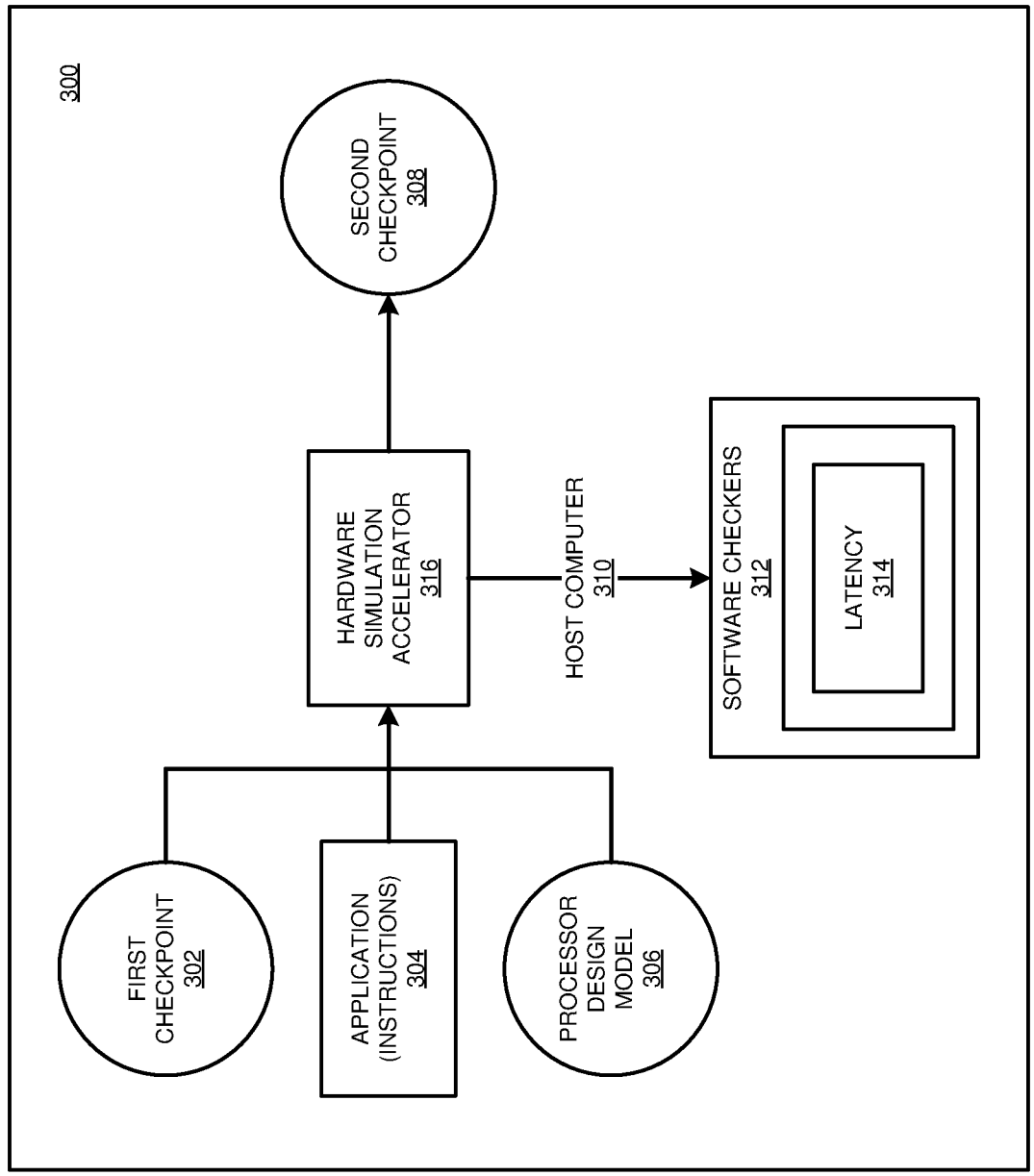
FIG. 3 illustrates a block diagram of an example latency detection system in accordance with an illustrative embodiment.

Turning now to FIG. 3 a hardware simulation accelerator 316 of a latency detection system 300 is shown. a block diagram of an example latency detection system. Hardware simulation accelerators 316 comprise large arrays of customized Application-specific integrated circuit (ASIC) processors, that are designed to simulate logic gates concurrently. To target these platforms, a compiler maps logic for functional execution on special purpose logic processors and no physical logic is involved to create timing/electrical issues. IBM AWAN is a non-limiting example of such a simulation accelerator is configured to provide hardware to assist in "emulating" the behavior of a design under test. (IBM and AWAN are marks owned by International Business Machines Corporation in the United States and in other countries). The hardware simulation accelerator 316 can have thousands of processors, which can emulate millions of gates thus providing provides high performance simulation that is orders of magnitude faster than traditional software simulation environments.

Unlike traditional software simulations, the hardware simulation accelerator 316 can have a speed in the order of 10 kilohertz (kHz) to 1 Megahertz (MHz) wherein arbitrarily large logic descriptions can be simulated in a time-multiplexed serial fashion, i.e. different parts of a design can be simulated sequentially for the same simulation cycle).

The hardware simulation accelerator 316 is connected to a host computer 310 from which a latency detection process is controlled, and to which recorded data is transferred. application (Instructions) 304 such as a workload software application or an exerciser can be stored and executed on the host computer 310 which controls the latency detection process running on the Hardware simulation accelerator 316. Selected signals are logged on the Hardware simulation accelerator 316 and are periodically sent to said host computer 310. The method of collecting a subset of signal for recording is known as "tracing" and those signals are known as "traced signals".

In the host computer 310, the selected signals is checked by Software Checkers 312 to debug the simulated design such as debugging a processor design model to find the Latency 314 of each transaction of the Application (Instructions) 304.

In an exemplary embodiment of the hardware simulation accelerator 316, the underlying architecture can record the values of said selected signals marked for observation in each cycle and store them in internal memory. When the memory is full, the process is stopped and the memory is transferred to the host computer 310 after which the process can continue.

With reference to the first checkpoint 302 and the Second Checkpoint 308, the hardware simulation accelerator 316 can establish a first checkpoint 302 in which the hardware simulation accelerator 316 receives a power on reset checkpoint file, an application (Instructions) 304 and a processor design model 306. Checkpointing is generally used hereinafter to describe a function provided by the hardware simulation accelerator 316 wherein the states of all the latches and other inputs that have been set to a desired value are saved at a specified point in time. Thus the state of all the combinational logic does not need to be preserved, because the state of latches and input/output (I/O) will propagate through the combinational logic at the time the checkpoint is restored (In other words, a checkpoint file is saved, said checkpoint file being a snapshot of the state of the processor design model 306 model at a particular point in time)

A point-of-interest checkpoint file is a checkpoint file that stores the state of the simulation model at a point of interest. The point of interest is a point within the software application being executed, for example, at a start of a transaction and at a completion of the transaction. Furthermore, in order to save memory, previously saved point-of-interest checkpoint files are replaced with new checkpoint files of interest.

In a further example, a point-of-interest checkpoint file is be a checkpoint file taken when a particular instruction address is encountered. Alternatively, a point-of-interest checkpoint file stores state information for the processor design model 306 at a particular point in time.

The application (Instructions) 304 comprises a plurality of transactions, wherein a latency of each transaction is measured. Herein, the hardware simulation accelerator 316 executes a number of transactions and for each transaction, a first checkpoint is established at the beginning of the transaction and a second checkpoint is established at a completion of the transaction. A meta state of the processor design model 306 is obtained for each checkpoint through, corresponding checkpoint files.

It will be appreciated that for latency detection, it is beneficial to perform a power on reset, self test, a serial flush of all latches, register initialization, and start functional clocks.

However, this is a complicated and time-consuming process that can be mitigated with a power on reset checkpoint file which allows the latency detection to begin in a timely fashion.

Figure 4:
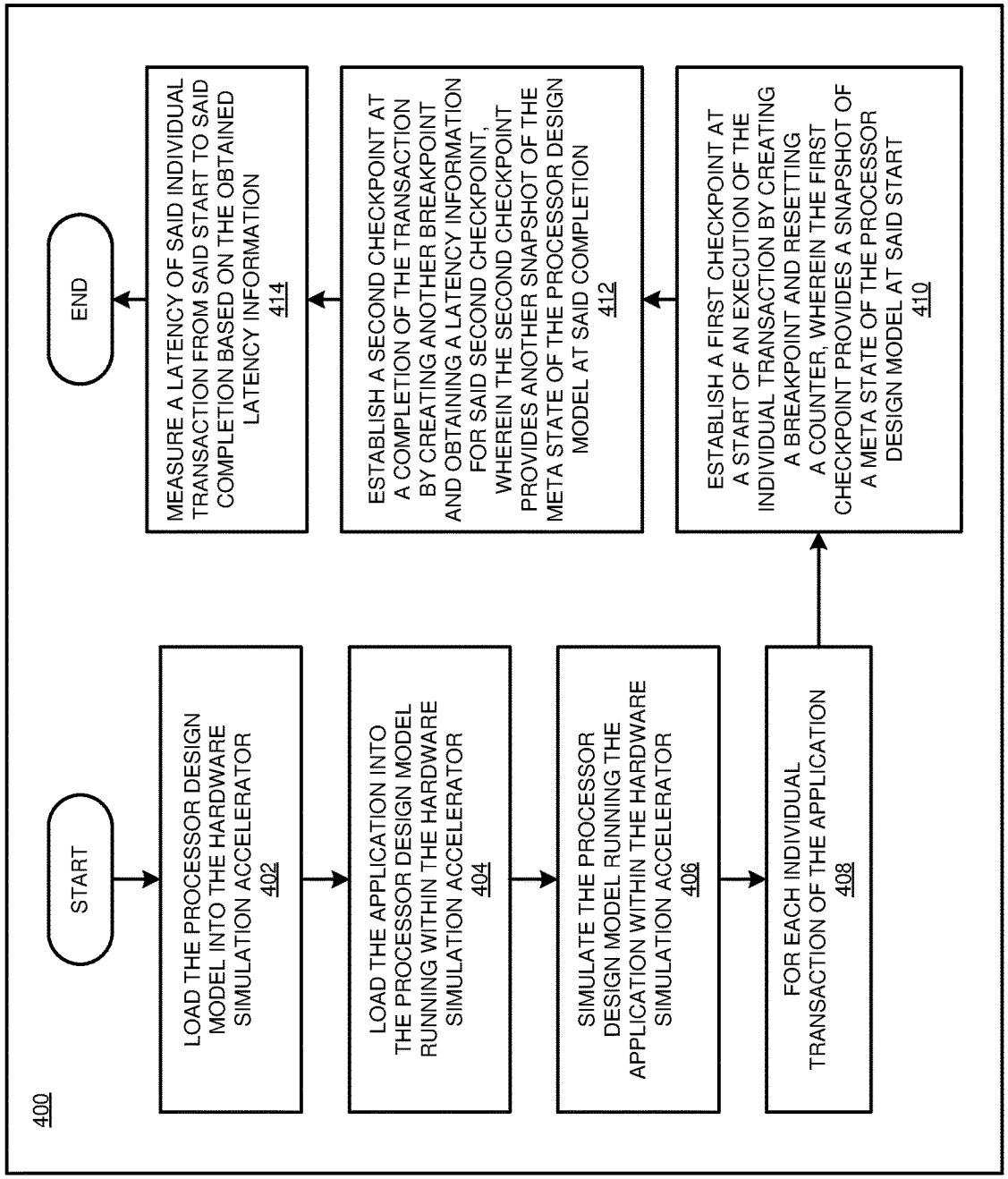
FIG. 4 illustrates a process 400 for performing automated detection of transaction latency for a processor design model running an application in a hardware simulation accelerator in accordance with one embodiment.

Turning now to FIG. 4, a process 400 of measuring latencies of individual transactions are discussed. In Step 402, process 400 loads the processor design model into the hardware simulation accelerator. In Step 404, process 400 loads the application into the processor design model running within the hardware simulation accelerator. In Step 406, process 400 simulates the processor design model running the application within the hardware simulation accelerator. In Step 408, process 400 for each individual transaction of the application. In Step 410, process 400 establishes a first checkpoint at a start of an execution of the individual transaction by creating a breakpoint and resetting a counter, wherein the first checkpoint provides a snapshot of a meta state of the processor design model at the start. In Step 412, process 400 establishes a second checkpoint at a completion of the transaction by creating another breakpoint and obtaining a latency information for the second checkpoint, wherein the second checkpoint provides another snapshot of the meta state of the processor design model at the completion. In Step 414, process 400 measures a latency of the individual transaction from the start to the completion based on the obtained latency information.

Step 402-Step 414 are described in more detail hereinafter.

The process 400 includes loading the processor design model 306 into the hardware simulation accelerator 316 (Step 402). The process 400 also includes getting the application (Instructions) 304 loaded on the processor design model 306 that resides on the hardware simulation accelerator 316 and the processor's execution of this application (Instructions) 304 started. The application (Instructions) 304 is, for example, a performance workload such as, but not limited to, a high-performance computing workload, a customer workload, or a random exerciser such as random codes configured to find logic issues in a processor, etc.

The processor design model 306 can be represented by using a hardware description language, such as VHDL (Very High Speed Integrated Circuit Hardware Description Language, VHSIC-HDL), Very High Speed Integrated Circuit Hardware Description Language)). Loading an application by a serial process in a lab is an extensive endeavor. Even with hardware acceleration, loading the application (Instructions) 304 would be very time consuming and error prone. Therefore, a loader can be utilized to accelerate the loading of the application (Instructions) 304 into the memory of the chip architecture and reduce the loading time from hours or days to a few minutes. Such a loader can be included as a module in a run time executable (RTX).

Such RTX components can form or be a part of the Software Checkers 312 and can be the controlling software of the latency detection process, residing on the host computer 310 which is in communication with the hardware simulation accelerator 316. This software can have a wide variety of function and interaction with the design under test. When using hardware accelerated simulation, there is a significant penalty for probing the model of the design under test. A reduced function RTX can therefore be used when it is not necessary to check or modify the designs behavior during the latency detection process to in order to achieve the greatest performance.

Further, the application (Instructions) 304 requires its own setup and initialization, which requires millions of simulation cycles to be run before processing cores are running the instructions for which latency detection measurements are to be performed.

For each transaction of the application (Instructions) 304, an operator may generate establish a first checkpoint 302 wherein the hardware simulation accelerator 316 generates a first checkpoint file to be used in measuring the latency of that transaction (Step 410). The operator may examine, for example, instruction addresses to determine whether the hardware simulation accelerator 316 has advanced to a portion of code that is of interest such as a completion of that transaction, wherein a Second Checkpoint 308 is established in which the hardware simulation accelerator 316 generates a second checkpoint file to be used in measuring the latency of that transaction (Step 412).

Software Checkers 312 are faster for creating for creating traces. Therefore, Software Checkers 312 receive the first and second checkpoint files in order to calculate a Latency 314 of the transaction. Latency can be calculated by taking the difference between the values of a latency counter in logic such as (Perfspray, i.e. Performance Bugspray which is logic built into a simulation model that is used to measure or aid in the measurement of performance) between the first and second checkpoint.

Figure 5:
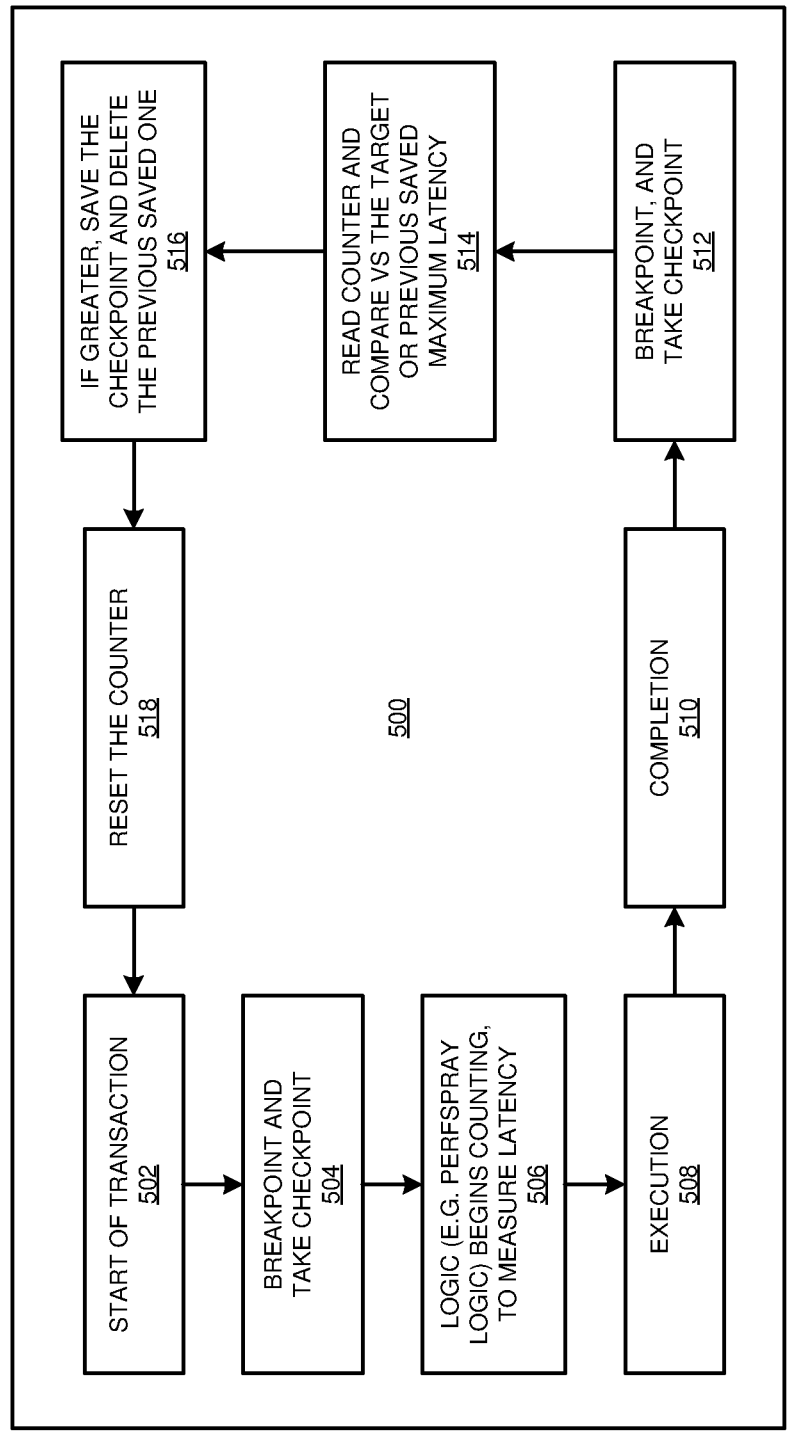
FIG. 5 illustrates a flowchart of an example process to determine latency in accordance with one illustrative embodiment.

Turning now to FIG. 5, an exemplary embodiment is shown wherein a process 500 allows for determining a maximum or target latency value of a series of transactions. A very first maximum or target latency value is set prior to the beginning of the latency test, based on for example, prior performance results (such as results from an existing idle latency test, in which the only operation that is running is the transaction for which you want to measure latency), for an initial comparison. Said very first maximum or target value may be, for example, a specified percentage below prior performance latency result per transaction. The units for these values are processor clock cycles. At the start of a current transaction (Step 502), before or at which a counter has been reset, a first checkpoint 302 for this current transaction is established by creating a breakpoint or checkpoint file (Step 504). The counter (e.g. Perfspray logic) then begins counting in order to provide information for latency measurements. The current transaction then executes (Step 508) to completion (STEP 510).

At the completion of the current transaction, a Second Checkpoint 308 for this current transaction is established by creating another breakpoint or checkpoint file (Step 512) and reading the counter to obtain a latency value for that transaction. (Counter data is stored in a checkpoint file. At the cycle the checkpoint is taken the counter is read from the design or the checkpoint. The checkpoint allows for the simulation to continue, but preserves the counter value and the other meta state). Said obtained latency value is then compared to the maximum or target latency value (Step 514).

If the obtained latency value is greater than the maximum or target latency value, the Second Checkpoint 308, which has information about the current transaction's latency value is saved. The current transaction's latency value becomes the new maximum or target latency value and any previous checkpoint that contains the previous maximum or target latency value is deleted (Step 516). If the current transaction's latency value is less than the maximum or target latency value, no action is taken. In Step 518, the counter is then reset and the next transaction starts. The process is repeated for all transactions until there are no transactions left. The first and second checkpoints can be saved as a pair. Any prior pair of checkpoints are then be deleted. The first checkpoint is used to collect a trace to debug the latency, and the second checkpoint stores the count of the latency for that transaction of interest.

Of course, It will be appreciated by a person or ordinary skill in the art, upon reading the disclosure that other variations of the process 500 can be envisioned.

Figure 6:
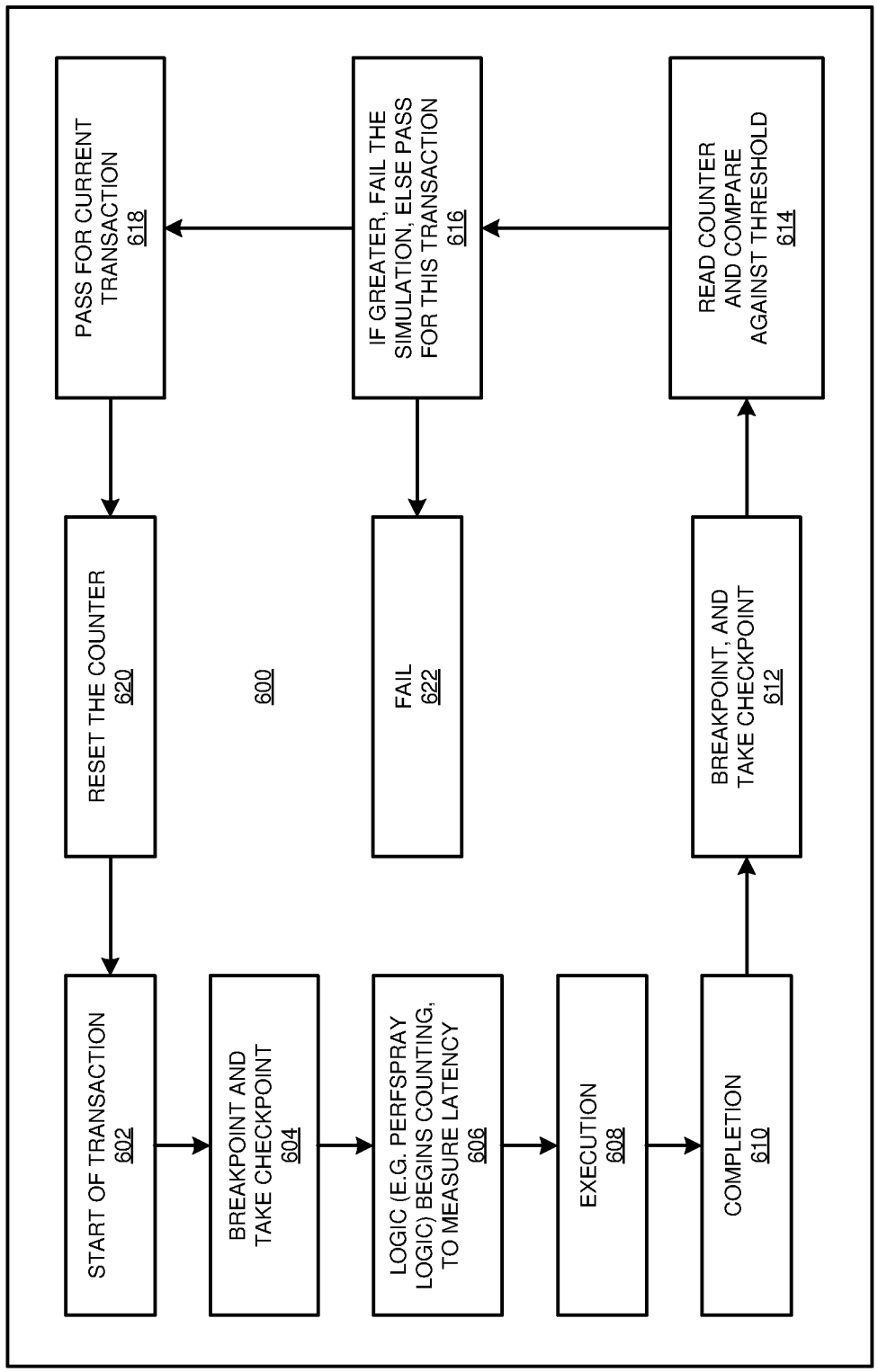
FIG. 6 illustrates a flowchart of an example process to determine latency in accordance with one illustrative embodiment.

Turning now to FIG. 6, an exemplary embodiment is shown wherein a process 600 allows for determining if a defined threshold latency value has been exceeded. Herein, a defined threshold is set prior to the beginning of the latency test, based on for example, prior performance results (such as from a threshold that is based on the theoretical worst case latency of the design), for test comparisons. Said defined threshold latency value can be, for example, a specified percentage above prior performance latency result per transaction. The units for these values are processor clock cycles. At the start of a current transaction (Step 602), before or at which a counter has been reset, a first checkpoint 302 for this current transaction is established by creating a breakpoint or checkpoint file (Step 604). The counter then begins counting in order to provide information for latency measurements. The current transaction then executes (Step 608) to completion (Step 610).

At the completion of the current transaction, a Second Checkpoint 308 for this current transaction is established by creating another breakpoint or checkpoint file (Step 612) and reading the counter to obtain a latency value for that transaction. Said obtained latency value is then compared to the defined threshold latency value (Step 614).

If the obtained latency value is greater than the defined threshold value, the Second Checkpoint 308, which has information about the current transaction's latency value is saved and the test if failed (Step 622). From the comparison of Step 616, if the current transaction's latency value is less than the defined threshold latency value, the current transaction passes (Step 618) and in Step 620, the counter is then reset for the next transaction. The process is repeated for all transactions until there is a transaction failure or until all transactions are completed without a transaction failure.

Of course, It will be appreciated by a person or ordinary skill in the art, upon reading the disclosure that other variations of the process 500 can be envisioned.

Thus, a computer implemented method, system or apparatus, and computer program product are provided in the illustrative embodiments for distinguishing an image of a three-dimensional object from an image of a two-dimensional rendering of an object and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    simulating a processor design model running an application within a hardware simulation accelerator, the hardware simulation accelerator comprising a plurality of application-specific integrated circuit processors, the processor design model comprising a plurality of logic gates represented using a hardware description language, the application comprising a plurality of transactions, the application loaded into a memory of the hardware simulation accelerator, the simulating comprising simulating, using the plurality of application-specific integrated circuit processors, execution of the plurality of logic gates;
    setting a previous measured latency to a target latency value; and
    for each individual transaction of the application:
        generating, by the hardware simulation accelerator at a start of an execution of the individual transaction, a first checkpoint file, the first checkpoint file comprising data of a meta state of the processor design model at said start, wherein the first checkpoint file comprises a value of a counter at said start;
        generating, by the hardware simulation accelerator at a completion of the individual transaction, a second checkpoint file, the second checkpoint file comprising data of the meta state of the processor design model at said completion, wherein the second checkpoint file comprises a value of the counter, wherein the simulating continues after generating the second checkpoint file;
        measuring, by a software checker using the first checkpoint file and the second checkpoint file, a latency of said individual transaction from said start to said completion;
        deleting, responsive to determining that the measured latency is less than or equal to the previous measured latency, the first checkpoint file and the second checkpoint file;
        replacing, responsive to determining that the measured latency is greater than the previous measured latency, the previous measured latency with the measured latency, the replacing comprising saving the first checkpoint file and the second checkpoint file; and
    deleting, subsequent to measuring a latency of each individual transaction of the application, a first checkpoint file and a second checkpoint file corresponding to a measured latency that is less than a maximum measured latency.

2. The method according to claim 1, wherein the target latency value is based on an existing idle latency test.

3. The method according to claim 2, wherein the target latency value is a defined percentage below a performance latency result per transaction of said existing idle latency test.

4. The method according to claim 1, wherein the replacing is performed responsive to determining that the measured latency is a defined percentage above the previous measured latency.

5. The method according to claim 1, wherein said latency is measured in processor clock cycles taken to complete the individual transaction.

6. The method according to claim 1 wherein the application is a workload software application or an exerciser.

7. A non-transitory computer-readable storage medium, the computer-readable storage medium including instructions that when executed by a computer, cause the computer to:
    simulate a processor design model running an application within a hardware simulation accelerator, the hardware simulation accelerator comprising a plurality of application-specific integrated circuit processors, the processor design model comprising a plurality of logic gates represented using a hardware description language, the application comprising a plurality of transactions, the application loaded into a memory of the hardware simulation accelerator, the simulating comprising simulating, using the plurality of application-specific integrated circuit processors, execution of the plurality of logic gates;

set a previous measured latency to a target latency value; and for each individual transaction of the application:
  generate, by the hardware simulation accelerator at a start of an execution of the individual transaction, a first checkpoint file, the first checkpoint file comprising data of a meta state of the processor design model at said start, wherein the first checkpoint file comprises a value of a counter at said start;
  generate, by the hardware simulation accelerator at a completion of the individual transaction, a second checkpoint file, the second checkpoint file comprising data of the meta state of the processor design model at said completion, wherein the second checkpoint file comprises a value of the counter, wherein the simulating continues after generating the second checkpoint file;
  measure, by a software checker using the first checkpoint file and the second checkpoint file, a latency of said individual transaction from said start to said completion;
  delete, responsive to determining that the measured latency is less than or equal to the previous measured latency, the first checkpoint file and the second checkpoint file;
  replace, responsive to determining that the measured latency is greater than the previous measured latency, the previous measured latency with the measured latency, the replacing comprising saving the first checkpoint file and the second checkpoint file; and
  delete, subsequent to measuring a latency of each individual transaction of the application, a first checkpoint file and a second checkpoint file corresponding to a measured latency that is less than a maximum measured latency.

8. A computer system, the computer system comprising:
a processor; and
a memory storing instructions that, when executed by the processor, configure the computer system to:
  simulate a processor design model running an application within a hardware simulation accelerator, the hardware simulation accelerator comprising a plurality of application-specific integrated circuit processors, the processor design model comprising a plurality of logic gates represented using a hardware description language, the application comprising a plurality of transactions, the application loaded into a memory of the hardware simulation accelerator, the simulating comprising simulating, using the plurality of application-specific integrated circuit processors, execution of the plurality of logic gates;
  set a previous measured latency to a target latency value; and
  for each individual transaction of the application:
    generate, by the hardware simulation accelerator at a start of an execution of the individual transaction, a first checkpoint file, the first checkpoint file comprising data of a meta state of the processor design model at said start, wherein the first checkpoint file comprises a value of a counter at said start;
    generate, by the hardware simulation accelerator at a completion of the individual transaction, a second checkpoint file, the second checkpoint file comprising data of the meta state of the processor design model at said completion, wherein the second checkpoint file comprises a value of the counter, wherein the simulating continues after generating the second checkpoint file;
    measure, by a software checker using the first checkpoint file and the second checkpoint file, a latency of said individual transaction from said start to said completion;
    delete, responsive to determining that the measured latency is less than or equal to the previous measured latency, the first checkpoint file and the second checkpoint file;
    replace, responsive to determining that the measured latency is greater than the previous measured latency, the previous measured latency with the measured latency, the replacing comprising saving the first checkpoint file and the second checkpoint file; and
  delete, subsequent to measuring a latency of each individual transaction of the application, a first checkpoint file and a second checkpoint file corresponding to a measured latency that is less than a maximum measured latency.

9. The computer system of claim 8, wherein the target latency value is based on an existing idle latency test.

10. The computer system of claim 9, wherein the target latency value is a defined percentage below a performance latency result per transaction of said existing idle latency test.

11. The computer system of claim 8, wherein the replacing is performed responsive to determining that the measured latency is a defined percentage above the previous measured latency.

12. The computer system of claim 8, wherein said latency is measured in processor clock cycles taken to complete the individual transaction.

13. The computer system of claim 8 wherein the application is a workload software application or an exerciser.

14. The computer system of claim 8 wherein the first and second checkpoints are saved as a pair.

* * * * *